Patented Oct. 20, 1936

2,058,222

UNITED STATES PATENT OFFICE 2,058,222

WATER-INSOLUBLE AZO-DYESTUFFS

Ernst Fischer, Offenbach-on-the-Main, Germany, assignor to General Aniline Works, Inc., New York, N. Y., a corporation of Delaware No Drawing. Application May 16, 1935, Serial No. 21,905. In Germany May 19, 1934

4 Claims. (Cl. 260—95)

The present invention relates to water-insoluble azo-dyestuffs; more particularly it relates to dyestuffs of the following general formula

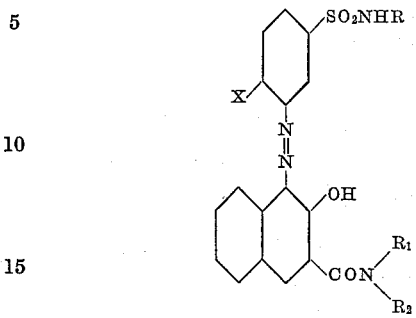

wherein the naphthalene nucleus may contain further substituents, X stands for an alkyl or alkoxy group, R for hydrogen, an alkyl, aryl, aralkyl or hydroaromatic radical and $R_1$ and $R_2$ mean hydrogen, alkyl, aryl, aralkyl or hydroaromatic radicals, or $R_1$ and $R_2$ are connected with each other to form a heterocyclic ring system, $R_1$ (or $R_2$) not being allowed to stand for hydrogen in case $R_2$ (or $R_1$) represents an aryl radical.

I have found that valuable red pigment dyestuffs are obtainable by coupling the diazo compounds of bases of the following general formula:

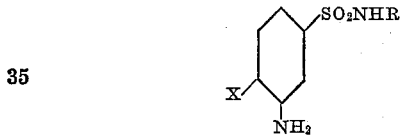

wherein X stands for an alkyl or alkoxy group and R for hydrogen, an alkyl, aryl, aralkyl or hydro-aromatic radical, with 2,3-hydroxynaphthoic acid derivatives of the general formula:

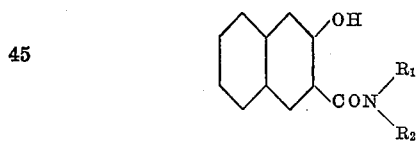

wherein the naphthalene nucleus may contain further substituents, $R_1$ and $R_2$ mean hydrogen, alkyl, aryl, aralkyl or hydroaromatic radicals, or $R_1$ and $R_2$ are connected with each other to form a heterocyclic ring system, $R_1$ (or $R_2$) not being allowed to stand for hydrogen in case $R_2$ (or $R_1$) represents an aryl radical, only such components being used as do not contain groups lending solubility, such as the sulfonic acid or carboxylic acid group.

The dyestuffs thus obtained are distinguished by properties of fastness which make them suitable for use on an industrial scale for the production of lakes which are fast to oils and to light, by conducting the coupling operation in presence of a substratum; the dyestuffs being practically insoluble in natural rubber or in synthetic products having properties similar to those of natural rubber, they are particularly useful in the rubber industry since they do not bleed in the production and treatment of rubber articles. By incorporating the dyestuffs with rubber products mixtures are obtained which are fast to vulcanization and to light.

The following examples serve to illustrate the invention, but they are not intended to limit it thereto:

(1) 10.8 grams of 3-amino-4-methoxybenzene-1-sulfonic acid-methylamide are diazotized in the usual manner. Thereupon sodium acetate is added to the diazo-solution in order to bind the excess of hydrochloric acid. The diazo-solution is then introduced, while stirring, into a solution of 13.8 grams of 2,3-hydroxynaphthoic acid-benzylamide in dilute caustic soda solution. The dyestuff which has separated is filtered by suction, washed well and dried. It forms a red powder and corresponds with the following formula:

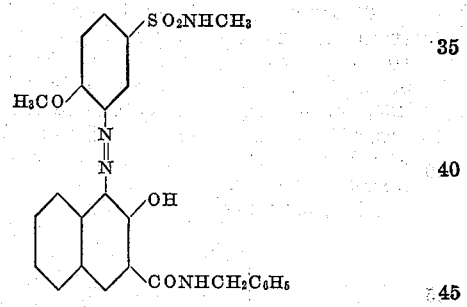

The coupling may also be conducted in the presence of a substratum adapted for the production of lakes, and lakes so prepared have a good fastness to oils and yield red tints which are fast to light.

(2) 13.1 grams of 3-amino-4-methylbenzene-1-sulfanilide are diazotized in the usual manner. The diazo-solution is rendered neutral to Congo paper by means of sodium acetate and is introduced, while stirring, into a solution of 13.4 grams of 2,3-hydroxynaphthoic acid-cyclohexylamide in dilute caustic soda solution. The red dyestuff, thus formed, is filtered by suction, washed well and dried. It has the following formula:

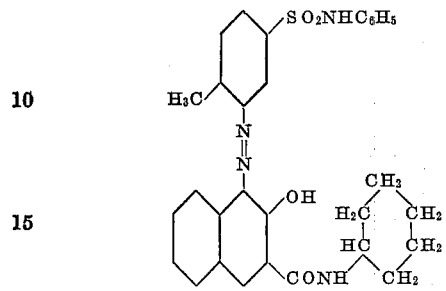

It may be used in known manner for the preparation of lakes which are fast to oils and yield red tints of good fastness to light.

(3) A pigment dye is prepared from 10.8 grams of 3-amino-4-methoxybenzene-1-sulfonic acid-methylamine and 17.8 grams of 6-bromo-2,3-hydroxynaphthoic acid-N-methyl-anilide in the manner described in Examples 1 and 2; it yields red lakes which are fast to oils and to light.

(4) A pigment dye which is adapted for coloring rubber products is prepared as described in Example 1 from 12.9 grams of 3-amino-4-methoxybenzene-1-sulfonic acid-n-butyl-amide and 9.3 grams of 2,3-hydroxynaphthoic acid-amide. Thereupon, 4 per cent of the dyestuff is incorporated with a suitable mixture of crepe rubber, loading materials, sulfur and vulcanization accelerators and the whole is vulcanized in a vulcanization press for about 12 minutes at a steam pressure of 3 atmospheres above atmospheric pressure. There is obtained a vivid red vulcanizate which is very fast to light and neither bleeds nor gives rise to that phenomenon which is known as blushing or efflorescence when the rubber articles are stored.

(5) A pigment dye is prepared from 11.5 grams of 3-amino-4-ethoxybenzene-1-sulfonic acid-methylamide and 13.8 grams of 2,3-hydroxynaphthoic acid-benzylamide, as described in Example 1. A mixture of crepe rubber, the usual admixtures and 4 per cent. of the aforesaid dyestuff is vulcanized in the cold by immersing it in a solution of sulfur chloride in benzine. The red mixture thus obtained is likewise fast to vulcanization and very fast to light.

(6) By using in Example 4 a dyestuff prepared from 14.5 grams of 3-amino-4-methylbenzene-1-sulfonic acid-2',4'-dimethylanilide and 17.2 grams of 2,3-hydroxynaphthoic acid-N-cyclo-hexylanilide, and incorporating it with a rubber product as described in Example 4, a red mixture is obtained which is fast to vulcanization and possesses a high fastness to light.

(7) The pigment dye of the following formula:

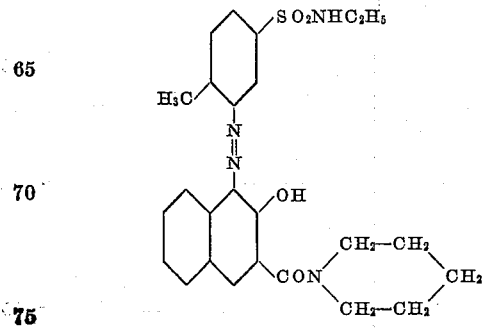

prepared from 10.7 grams of 3-amino-4-methylbenzene-1-sulfonic acid-ethylamide and 12.7 grams of 2,3-hydroxynaphthoic acid-piperidide is incorporated with a rubber product in the manner indicated in Example 4. There is obtained a vivid orange mixture which is likewise fast to vulcanization and to light.

The following dyestuffs, among others, are capable of production in accordance with this invention:

| | Diazo-compound of: | Coupled with: | Shade: |
|---|---|---|---|
| | 3 - amino - 4 - methyl-benzene - 1 - sulfonic acid- | 2,3- hydroxynaphthoic acid- | |
| 1 | Amide | Amide | Red |
| 2 | Methylamide | Amide | Red |
| 3 | Benzylamide | Amide | Red |
| 4 | Cyclohexylamide | Amide | Orange-brown |
| 5 | Anilide | Amide | Red |
| 6 | 4'-aminodiphenyl | Amide | Red |
| 7 | Ethylamide | Benzylamide | Red |
| 8 | Amide | Cyclohexylamide | Red |
| 9 | Anilide | 1',2',3',4' - tetrahydro-2' - aminonaphtha-lene. | Red |
| 10 | 2' - methyl - 3' - chlor-anilide. | Diethylamide | Red |
| 11 | 2',4' - dimethyl-anilide | Diphenylamide | Yellow-red |
| 12 | Benzylamide | N-methyl-anilide | Yellow-red |
| 13 | 2' - methyl - 3' - chlor-anilide. | N-benzylanilide | Red |
| 14 | Anilide | N-methylanilide | Red |
| 15 | Amide | N-carbazole | Red |
| 16 | Amide | N -methyl-cyclohexyl-amide. | Red |
| 17 | Amide | Dibenzylamide | Red |
| 18 | Amide | N - benzyl-cyclohexyl-amide. | Red |
| 19 | 1',2',3',4' - tetrahydro - 2'-aminonaphthalene. | Amide | Red |
| 20 | 1'¹ - amino - 1'-methyl-naphthalene. | Amide | Red |
| | 3 - amino - 4 - methoxy-benzene - 1 - sulfonic acid- | | |
| 21 | Amide | Amide | Red |
| 22 | Methylamide | Amide | Red |
| 23 | Cyclohexylamide | Amide | Red |
| 24 | Methylamide | Ethylamide | Red |
| 25 | Anilide | Cyclohexylamide | Red |
| 26 | Cyclohexylamide | N-methylanilide | Red |
| 27 | Amide | N-methylbenzylamide | Red |
| 28 | Amide | N-cyclohexylanilide | Red |
| 29 | 3 - amino - 4 - ethoxy-benzene - 1 - sulfonic acid-methyl-amide. | 1¹ - amino - 1 - methyl-naphthalene. | Red |
| | | 6- bromo-2,3-hydroxy-naphthoic acid- | |
| 30 | 3 - amino - 4 - methyl-benzene - 1 - sulfonic acid-anilide. | Benzylamide | Red |
| 31 | 3 - amino - 4 - methoxy-benzene - 1 - sulfonic acid-anilide. | Benzylamide | Bluish-red |
| 32 | 3 - amino - 4 - ethoxy-benzene - 1 - sulfonic acid-ethyl-amide. | Benzylamide | Bluish-red |
| 33 | 3 - amino - 4 - methyl-benzene - 1 - sulfonic acid-anilide. | 6 - methoxy - 2, - 3 hy-droxy-naphthoic acid benzylamide. | Bluish-red |

Since an object of the present invention is to produce dyestuffs of good fastness properties which dyestuffs are insoluble in water, it is to be understood that the aromatic nuclei of the general formulae appearing in the appended claims do not contain any substituents which are known to render the dyestuffs soluble in water. Substituents of this kind are, for instance, the sulfonic acid and carboxylic acid group.

I claim:

1. The water-insoluble azo-dyestuffs of the following general formula:

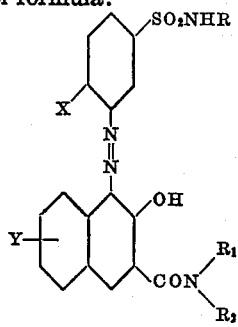

wherein Y represents a member of the group consisting of hydrogen, bromine and methoxy, X stands for a member of the group consisting of alkyl or alkoxy, R, $R_1$ and $R_2$ each stand for a member of the group consisting of hydrogen, alkyl, aryl, aralkyl and hydroaryl, or $R_1$ and $R_2$ are connected with each other to form a heterocyclic ring system, one of the two radicals $R_1$ and $R_2$ not being allowed to stand for hydrogen in case the other radical represents an aryl group, yielding fast red lakes and, when mixed with rubber products, red dyeings of very good fastness to light and to vulcanization.

2. The water-insoluble azo-dyestuff of the following formula:

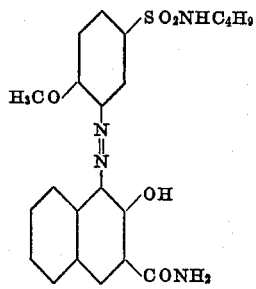

yielding fast red lakes and, when mixed with rubber products, red dyeings of very good fastness to light and to vulcanization.

3. The water-insoluble azo-dyestuff of the following formula:

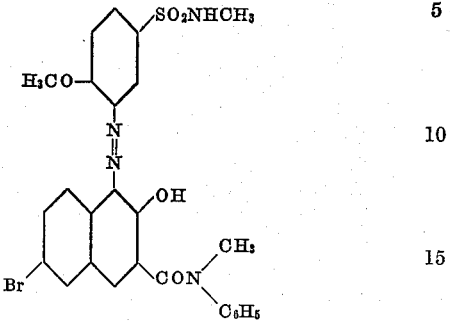

yielding fast red lakes and, when mixed with rubber products, red dyeings of very good fastness to light and to vulcanization.

4. The water-insoluble azo-dyestuff of the following formula:

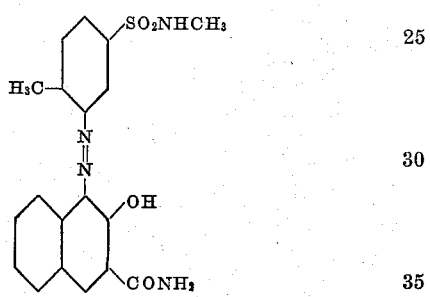

yielding fast red lakes and, when mixed with rubber products, red dyeings of very good fastness to light and to vulcanization.

ERNST FISCHER.